April 18, 1950     W. E. ESSLIE     2,504,512
SELF-SOLDERING SLEEVE
Filed Dec. 5, 1945
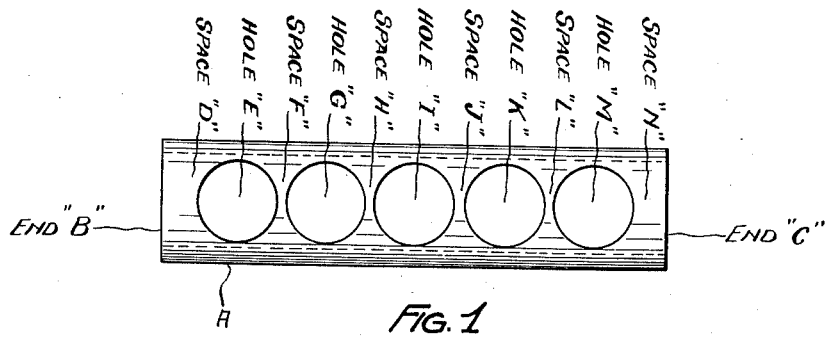
 
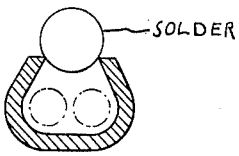 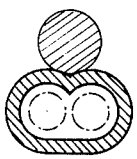
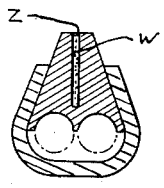 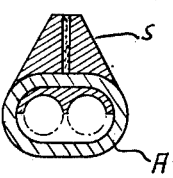
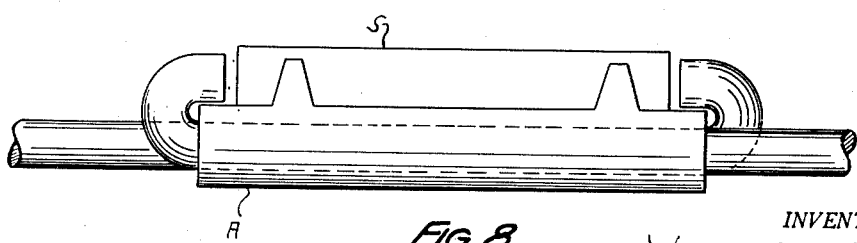
INVENTOR.
Warren E. Esslie
BY
Oldham & Oldham
attorneys Patented Apr. 18, 1950

2,504,512

UNITED STATES PATENT OFFICE 2,504,512

SELF-SOLDERING SLEEVE

Warren E. Esslie, Cleveland, Ohio

Application December 5, 1945, Serial No. 632,960

1 Claim. (Cl. 113—110)

The invention relates to the improvement in soldering wires with a self-soldering sleeve in which the wires are inserted and bent and sufficient heat applied to melt the solder in the sleeve; and the object of the improvement is to secure a tight joint with no extra solder and with less labor and time.

The invention is illustrated in the accompanying drawings in which Figure 1 is a view showing the top surface of tube A; Figure 2 is an end view of tube A showing space for housing two 12-gauge wires; Figure 3 is a sectional view of tube A showing the depressed metal in the spaces D, H, J, and N; Figure 4 is a cross section of tube A showing the elevated metal in the spaces F and L; Figure 5 is a sectional view of tube A showing the solder in place over the five holes E, G, I, K and M, and in the depressed spaces D, H, J and N; Figure 6 is a cross section of tube A at F and L showing the truncated pyramid of solder extending down to the upper surface of the spaces reserved for the two 12-gauge wires and shows the position of the metal at F and L clinching the solder in position; Figure 7 is a cross section of tube A showing the truncated pyramid of solder in the depressed spaces D, H, J and N, and between the elevated metal in the spaces F and L; Figure 8 is a side view of tube A with the wires turned upward over the ends of the tube.

Referring more in detail to the drawings, a flattened tube A is shown and has a plurality of holes E, G, I, K and M formed in its upper surface. The bridging portions of the tube at spaces F and L are pulled out and up in any suitable manner so as to break them and have them extend up from the remainder of the tube, as shown in Fig. 6. The remainder of the tube, excepting spaces F and L, must be so shaped that it will conform closely to the space in which the wires eventually will be inserted when the sleeve is used. (There are no wires in this self-soldering sleeve. The wires are inserted only when the sleeve is used.)

Solder for sealing the connection is provided in the shape of a cylinder, as shown in Figs. 4 and 5. Such solder is wedged between or slid under the upwardly extending portions of the tube A originally forming spaces F and L, and next a suitable die is inserted inside the tube and another forming member is brought down against the upwardly extending tube portions and the solder so as to form it substantially to frusto-pyramidal shape. The solder now bears on the depressed spaces D, H, J and N and between the elevated metal in the spaces F and L, and is forced down through the openings E, J, I, K and M, and conforms closely to the upper surface reserved for the two conductors. This securely locks the solder in position.

So as to make the connector completely ready for soldering action, I drill or otherwise form a plurality of holes Z in the upper portion of the solder and insert a suitable flux W therein. The solder then may be peened over the flux W to aid in retaining it in position. Thus the solder has flux associated with local areas thereof.

The connector sleeve may be heated in any desired manner and such heat will melt the solder and flux and permit it to flow down around the conductors X and Y without destroying the tube A. The flux holes Z extend substantially through the solder S to facilitate deposit of flux rapidly at the connection to be soldered when the connector sleeve is heated.

Modification of the example of the invention given herein may be resorted to within the scope of the following claims.

I claim:

A connector for use in forming a soldered joint, which connector comprises a partially flattened tubular member having a plurality of holes in one of its opposed surfaces and having opposed upstanding fingers formed on its perforated side, said tubular member being adapted to receive a plurality of conductors therein, a body of solder associated with the perforated side of said tubular member externally of such member and secured thereto by said fingers, and a soldering flux positioned in separated local areas of said solder body spaced longitudinally thereof.

WARREN E. ESSLIE.

REFERENCES CITED

The following references are of record in the file of this patent:

UNITED STATES PATENTS

| Number | Name | Date |
|---|---|---|
| 934,711 | Chapman | Sept. 21, 1909 |
| 1,662,945 | Weilage | Mar. 20, 1928 |
| 1,952,561 | Morgan | Mar. 27, 1934 |
| 2,055,878 | Palmer | Sept. 29, 1936 |
| 2,146,393 | Burrell | Feb. 7, 1939 |

FOREIGN PATENTS

| Number | Country | Date |
|---|---|---|
| 441,746 | France | 1912 |
| 248,020 | Germany | 1912 |
| 31,444 | Switzerland | 1911 |